United States Patent
Kaneko et al.

(10) Patent No.: US 6,404,473 B1
(45) Date of Patent: *Jun. 11, 2002

(54) DISPLAY DEVICE HAVING A WIRING MULTI-LAYERED STRUCTURE WITH TAPERED FIRST LAYER AND A MANUFACTURING PROCESS FOR THE TAPERED STRUCTURE

(75) Inventors: Toshiki Kaneko, Chiba; Yuichi Hashimoto, Mobara; Kikuo Ono, Mobara; Kazuhiro Ohhara, Mobara; Takahiro Ochiai, Mobara; Masaru Takabatake, Mobara; Kenichi Onisawa, Hitachinaka; Kenichi Cyahara, Hitachi, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,078

(22) Filed: Jun. 5, 1998

(30) Foreign Application Priority Data

Jun. 12, 1997 (JP) .............................................. 9-155238

(51) Int. Cl.[7] ........................ G02F 1/1343; G02F 1/136
(52) U.S. Cl. ........................... 349/139; 349/46; 349/51; 349/147; 349/148
(58) Field of Search .............................. 349/46, 43, 51, 349/148, 147, 38, 139; 437/192, 947

(56) References Cited

U.S. PATENT DOCUMENTS

| | | | | |
|---|---|---|---|---|
| 5,162,933 A | * | 11/1992 | Kakuda et al. | 349/147 |
| 5,361,153 A | * | 11/1994 | Shimamune et al. | 349/139 |
| 5,428,250 A | * | 6/1995 | Ikeda et al. | 349/148 |
| 5,464,500 A | * | 11/1995 | Tsujimura et al. | 216/34 |
| 5,670,062 A | | 9/1997 | Lin et al. | |
| 5,693,983 A | | 12/1997 | Ho et al. | |
| 5,708,484 A | * | 1/1998 | Someya et al. | 349/43 |
| 5,739,877 A | * | 4/1998 | Onisawa et al. | 349/147 |
| 6,226,060 B1 | * | 5/2001 | Onisawa et al. | 349/43 |

FOREIGN PATENT DOCUMENTS

| | | | |
|---|---|---|---|
| EP | 0 795 776 | * | 9/1997 |

* cited by examiner

Primary Examiner—William L. Sikes
Assistant Examiner—Tarifur R. Chowdhury
(74) Attorney, Agent, or Firm—Antonelli, Terry, Stout & Kraus, LLP (57) ABSTRACT

A liquid crystal display device comprising a wiring line of a laminated structure over an insulating substrate. The laminated structure includes a first layer made of a first metal layer, and a second layer formed over the first layer and made of a second metal layer having the same principal component as that of the first metal layer but a different added element and/or a different composition. The first layer has a side end face of a right-tapered shape, whereas the second layer has a side end face set at a right angle or counter-tapered with respect to the substrate face.

29 Claims, 9 Drawing Sheets

DISPLAY DEVICE HAVING A WIRING MULTI-LAYERED STRUCTURE WITH TAPERED FIRST LAYER AND A MANUFACTURING PROCESS FOR THE TAPERED STRUCTURE

BACKGROUND OF THE INVENTION

The present invention relates to a liquid crystal display device and, more particularly, to a liquid crystal display device which exhibits an improved production yield through elimination of disconnection in a wired laminated portion of an active matrix liquid crystal display device of the thin film transistor (TFT) type.

The liquid crystal display device has been widely utilized as a device for displaying a variety of images, including still images and moving images.

The liquid crystal display device is basically classified into two types, including the type (called the "simple matrix type") wherein a liquid crystal layer is sandwiched between two substrates, at least one of which is made of transparent glass, and wherein a predetermined pixel is turned ON/OFF by applying a voltage selectively to various electrodes formed on the substrates for forming the pixels; and the type (called the "active matrix type" in which thin film transistors (TFT) are used as the switching elements) wherein the various electrodes and pixel selecting switching elements are formed so that a predetermined pixel is turned ON/OFF by selecting the switching elements.

The active matrix type liquid crystal display device has grown to be the main type used for display devices because of its contrast performance and quick display performance.

In the active matrix type liquid crystal display device, the longitudinal field type is generally employed, in which an electric field for changing the orientation of a liquid crystal layer is applied between electrodes formed on one substrate and electrodes formed on the other substrate. In recent years, however, a transverse field type (In-Plane Switching Mode: IPS type) liquid crystal display device has been introduced, in which the direction of the electric field to be applied to the liquid crystal is generally in parallel with the substrate face.

Figure 10:
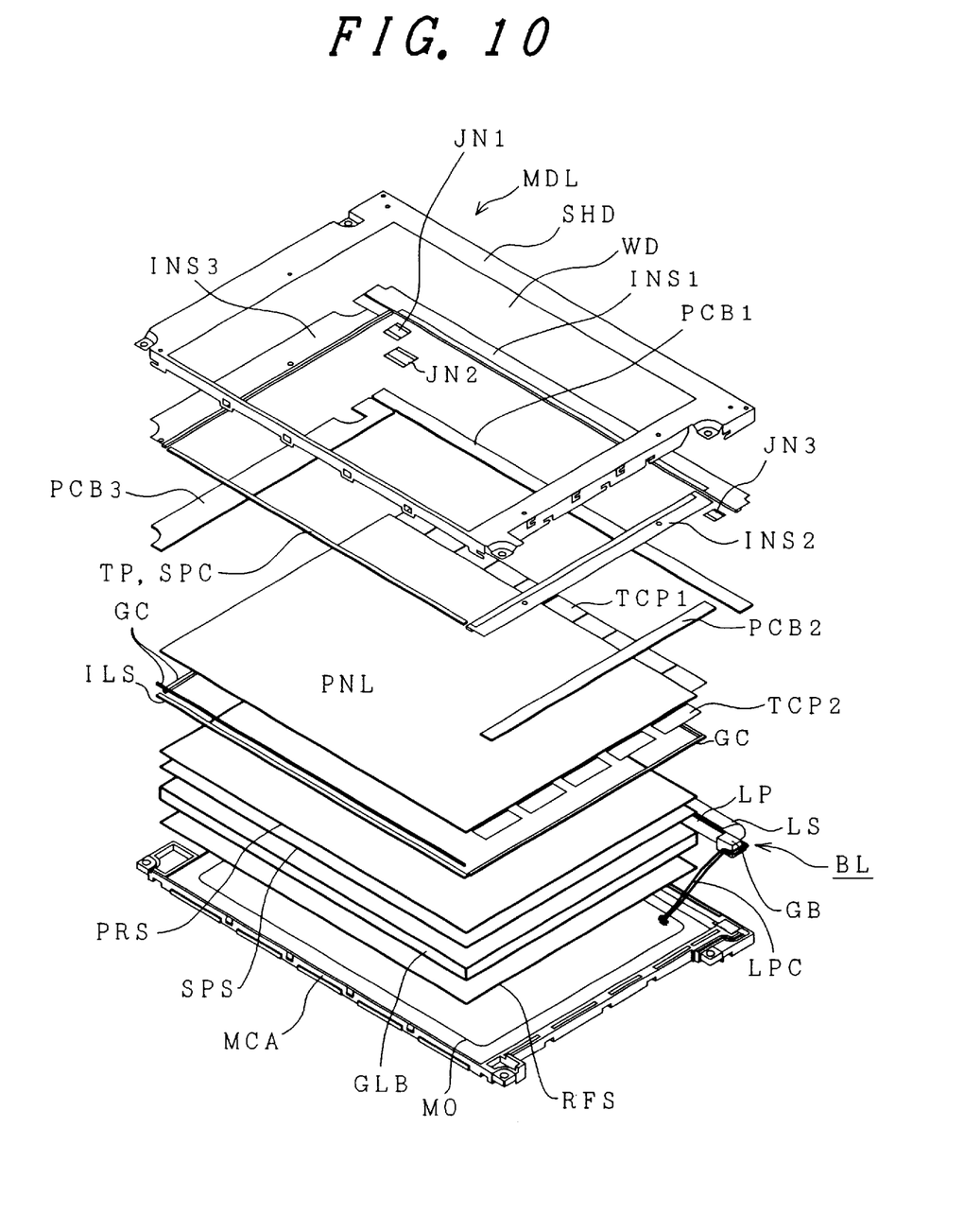
FIG. 10 is an exploded perspective diagram for explaining the overall structure of an active matrix type liquid crystal display device using an orientation film according to the invention.

FIG. 10 is an exploded perspective diagram for explaining the overall structure of the active matrix type liquid crystal display device using an orientation film according to the present invention.

FIG. 10 illustrates the specific structure of the liquid crystal display device (or the module having a liquid crystal display panel, a circuit substrate, a back light and other components integrated to form a module called a "MDL") according to the invention.

Reference letters SHD designate a shield case (also called the "metal frame") made of metal sheet; letters WD designate a display window; letters INS1 to INS3 designate insulating sheets; letters PCB1 to PCB3 designate circuit substrates (of which PCB1 is a drain side circuit substrate and a video signal line driving circuit substrate; PCB2 is a gate side circuit substrate; and PCB3 is an interface circuit substrate); letters JN1 to JN3 designate joiners for joining the circuit substrates PCB1 to PCB3 electrically; letters TCP1 and TCP2 designate tape carrier packages; letters PNL designate a liquid crystal display panel; letters GC designate a rubber cushion; letters ISL designate a shielding spacer; letters PRS designate a prism sheet; letters SPS designate a scattering sheet; letters GLB designate a light guide board; letters RFS designate a reflection sheet; letters MCA designate a lower case (or mold frame) formed by integral molding; letters MO designate an opening in the MCA; letters LP designate a fluorescent lamp; letters LPC designate a lamp cable; letters GB designate a rubber bushing for supporting the fluorescent lamp LP; letters BAT designate a pressure sensitive adhesive double coated tape; and letters BL designate a back light composed of the fluorescent lamp and the light guide board. The scattering sheet members are stacked in the illustrated arrangement to assemble the liquid crystal display module MDL.

The liquid crystal display module MDL includes two kinds of accommodating/holding members for the lower case MCA and the shield case SHD and is constructed by integrating the metallic shield case SHD accommodating and fixing the insulating sheets INS1 to INS3, the circuit substrates PCB1 to PCB3 and the liquid crystal display panel PNL, and the lower case MCA accommodating the back light BL composed of the fluorescent lamp LP, the light guide board GLB and the prism sheet PRS.

On the video signal line driving circuit substrate PCB1, there is mounted an integrated circuit chip for driving the individual pixels of the liquid crystal display panel PNL. On the interface circuit substrate PCB3, on the other hand, there are mounted an integrated circuit chip for receiving video signals from an external host and control signals, such as timing signals, and a timing converter TCON for generating clock signals by processing the timings.

The clock signals, as generated by the timing converter, are fed through a clock signal line CLL, which is laid on the interface circuit substrate PCB3 and the video signal line driving circuit substrate PCB1, to the integrated circuit chip which is mounted on the video signal line driving circuit substrate PCB1.

The interface circuit substrate PCB3 and the video signal line driving circuit substrate PCB 1 are multi-layered wiring substrates, and the clock signal line CLL is formed as an inner wiring line of the interface circuit substrate PCB3 and the video signal line driving circuit substrate PCB1.

Here, the liquid crystal display panel PNL is constructed by adhering two substrates, including the TFT substrate having TFTs and various wiring lines/electrodes, and the filter substrate having the color filter, and by sealing the liquid crystal in the clearance between the two substrates, such that the drain side circuit substrate PCB1 for driving the TFTs, the gate side circuit substrate PCB2 and the interface circuit substrate PCB3 are connected by the tape carrier packages TCP1 and TCP2, and such that the individual circuit substrates are connected by the joiners JN1, JN2 and JN3.

Figure 11:
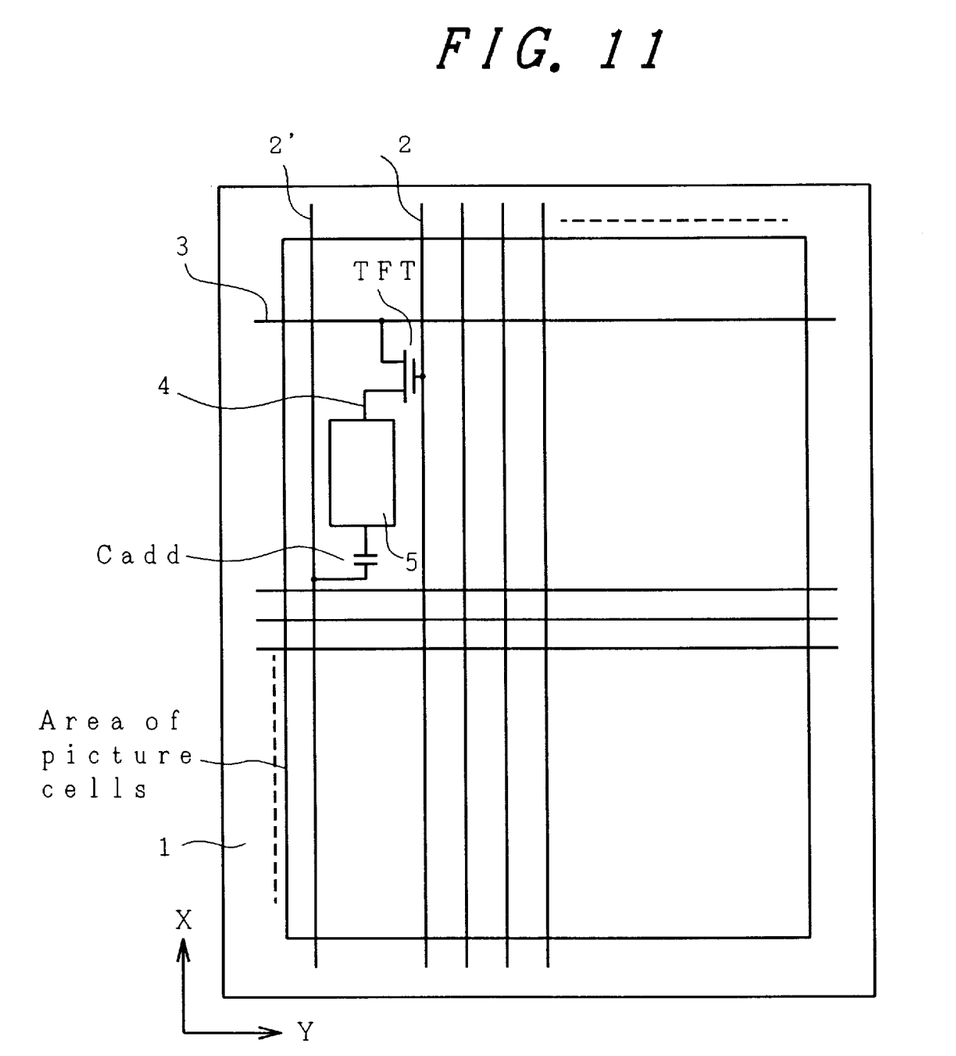
FIG. 11 is a schematic diagram for explaining the wired structure in the vicinity of one pixel of a TFT substrate forming the liquid crystal display device shown in FIG. 10.

FIG. 11 is a schematic diagram for explaining the wired structure in the vicinity of one pixel of the TFT substrate forming the liquid crystal display device shown in FIG. 10. Reference numeral 1 designates a substrate; numeral 2 designates a scanning signal line (or gate line); numeral 2' designates an adjacent scanning signal line (or adjoining gate line); numeral 3 designates a video signal line (or drain line); numeral 4 designates a source electrode; numeral 6 designates a pixel electrode; letters TFT designate a thin film transistor; and letters Cadd designate a capacity added element.

In FIG. 11, the central portion of the substrate 1, except for the periphery, provides a display region which is filled with a liquid crystal material in the clearance which is formed by joining the other substrate or the filter substrate to it.

In this display region, moreover, there are formed the scanning signal line 2 (or gate line), extending in an X-direction, and the video signal line 3 (or drain line), extending in a Y-direction. There is further formed a source electrode, which extends in the Y-direction while being insulated from the scanning signal line 2, which also extends in the X-direction.

Each region, as defined by the scanning signal line 2 and video signal line 3, forms one pixel.

In other words, the aforementioned display region is formed of a set of numerous pixel regions arranged in a matrix shape.

Each pixel region is composed of the thin film transistor TFT to be turned On when a scanning signal is fed from the scanning signal line 2 and the video signal line 3, so that the pixel electrode 5 is fed by the video signal from the video signal line 3 passing through the thin film transistor TFT, which is turned ON. In addition to the thin film transistor TFT and pixel electrode 5, the capacity added element Cadd is formed between the adjoining scanning signal line 2', other than the scanning signal line 2 for driving the thin film transistor TFT, and the aforementioned pixel electrode 5.

This capacity added element Cadd is provided for storing the video signal for an extended time in the pixel electrode 5 even when the thin film transistor TFT is turned OFF.

In this kind of liquid crystal display device, the aforementioned wiring lines for selecting the pixels are formed over the substrate 1 by using various filming means and patterning means.

For the wiring lines of the active matrix liquid crystal display device of the thin film transistor type, there is employed a refractory metal which has few hillocks. This wiring material can be exemplified by chromium (Cr) or molybdenum (Mo) as a pure metal. An alloy material to be used is exemplified by an alloy of Cr and Mo or an alloy of Mo and tungsten (W).

Of the pure metals, Cr is excellent in its adhesion to the substrate and the resist and is featured by the fact that the etching end portion is formed at a right angle with respect to the substrate face when the wiring line is etched.

When the wiring lines (or lower layer wiring lines) are formed in the lowermost layer of the substrate by using a material having such characteristics, the so-called "step coverage" at the vertical wall of the etching end is deteriorated by the insulating film or the like, as formed over the lower wiring lines. This causes problems, such as a deterioration in the breakdown voltage or disconnection of the portions where the lower wiring lines are crossed over by other wiring lines (or upper wiring lines) formed over the former.

Figure 12:
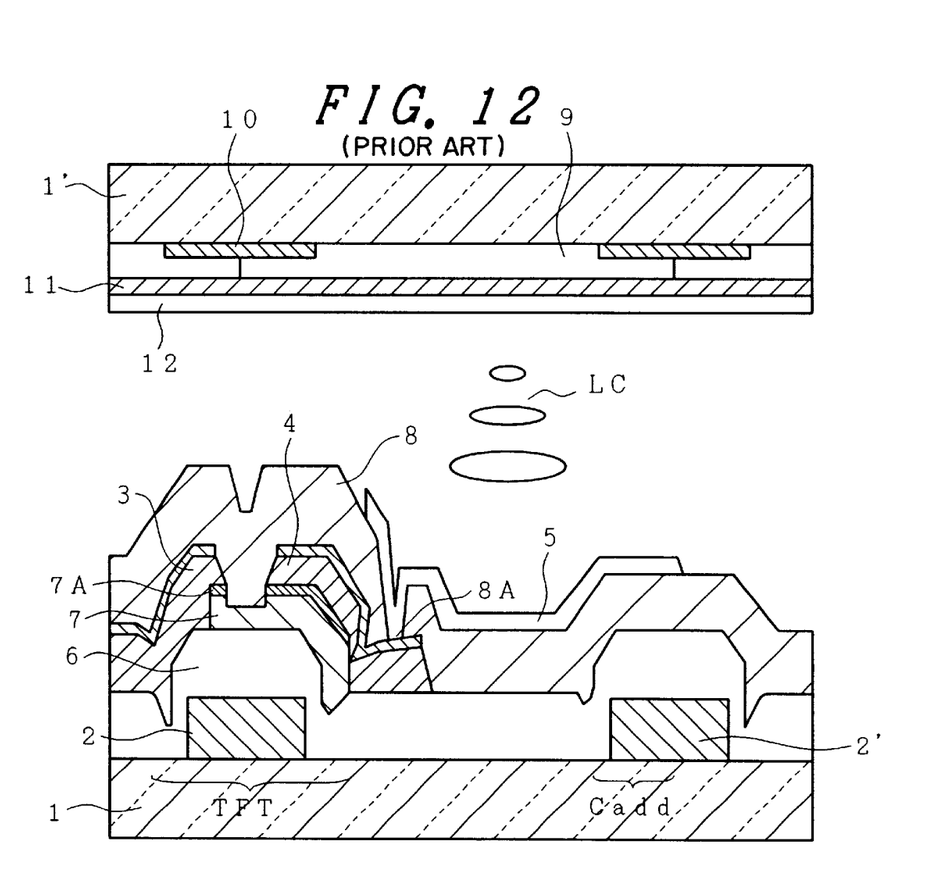
FIG. 12 is a partial section for explaining the structure in the vicinity of the TFT of a conventional the liquid crystal display device.

FIG. 12 is a partial section for explaining the structure in the vicinity of a TFT, using as an example the construction of a conventional liquid crystal display device. As in FIG. 11, reference numeral 1 designates a TFT substrate; numeral 1' designates a filter substrate; numeral 2 designates a scanning signal line (or gate electrode); numeral 3 designates a video signal line (or drain electrode 3); numeral 4 designates a source electrode; numeral 5 designates a pixel electrode; numeral 6 designates an insulating film; numeral 7 designates a semiconductor layer; numeral 7A designates a contact layer; numeral 8 designates a passivation film; numeral 8A designates a contact hole; numeral 9 designates a color filter; numeral 10 designates a black matrix; numeral 11 designates a smoothing layer; numeral 12 designates a common electrode; letters TFT designates a thin film transistor; letters Cadd designate a capacity added element; and letters LC designate a liquid crystal.

At the TFT portion over the TFT substrate 1 or one substrate, as shown in FIG. 12, the gate electrode 2, the insulating film 6, the semiconductor layer 7, the contact layer 7A, the drain electrode 3, the source electrode 4, the passivation film 8, the pixel electrode 5 and so on are stacked in a multilayered structure by filming them and by patterning with etching treatment. In the capacity added portion, on the other hand, the adjoining gate electrode 2', the insulating film 6, the passivation film 8 and the pixel electrode 5 are likewise laminated.

As described hereinbefore, the gate electrode 2, as formed in the lowermost layer of the substrate 1, is made of either the pure Cr or a Cr—Mo alloy and is worked at its end portion (or side end face) at a right angle with respect to the face of the substrate 1 by etching treatment. As a result, the insulating film 6, as formed thereover, is insufficiently covered at its edge portion, as shown, by the normal wall face.

Over the insulating film 6, there are formed the drain electrode 3 and the source electrode 4. At the portions where the drain electrode 3 and source electrode 4 ride over the gate electrode 2, the insulation gap or the film thickness becomes small, as shown, to cause problems, such as a drop in the breakdown voltage, short-circuiting or disconnection.

On the other hand, the wiring line made of pure Cr is troubled by the problem that its upper face is exposed to a dry etching atmosphere which tends to produce a fluoride, thereby to deteriorate the contact characteristics with the film formed thereover. When the wiring line is made of a Mo—W alloy, the adhesion to the bed or substrate is weakened to raise a problem that the wiring line is easily separated by thermal hysteresis after being filmed.

A technique is disclosed in Unexamined Published Japanese Patent Application No. 7-301822 for solving the problem of the step coverage in the formation of a wiring line of this kind. In the technique disclosed, two alloy layers having different compositions of Cr and Mo are formed as the wiring line material by the sputtering method or the like so that the etched end portion may be right-tapered merely by making use of the difference in the etching rate between the lower layer and the upper layer.

In the publication described above, the adhesion to the substrate is similar to that which is obtained by using a Cr—Mo alloy material. Although the problem of the step coverage has been solved, the problem of the separation of the wiring line from the substrate is still left unsolved so that a sufficient reliability cannot be achieved.

SUMMARY OF THE INVENTION

An object of the invention is to solve the aforementioned various problems inherent in prior devices and to provide a liquid crystal display device which is capable of providing improved reliability by improving the contact characteristics between the lower layer wiring line and the upper conductor film, by more sufficient step coverage of the upper film such as the insulating film, by improving the adhesion to the substrate and by preventing the cutting of the upper layer wiring line and the short-circuiting of the lower layer wiring line.

In order to achieve the above-specified object, the invention utilizes the difference in the corrosion rate due to the corrosion potential difference between different kinds of metals and is characterized by the following features (1) to (7):

(1) A liquid crystal display device is provided with a wiring line having a laminated structure over an insulating substrate, wherein said laminated structure includes a first layer made of a first metal layer and a second layer formed over said first layer and made of a second metal layer having the same principal component as that of said first metal layer, but a different added element and/or a different composition, and wherein said first layer has a side end face having a right-tapered shape, whereas said second layer has a side end face set at a right angle or is counter-tapered with respect to the substrate face.

(2) A liquid crystal display device is provided with one substrate having a plurality of wiring lines, including a scanning signal line, a video signal line and a pixel electrode, and an active element connected with said scanning signal line and said video signal line for controlling ON/OFF operation of the pixel; the other substrate including at least a color filter and which is adhered through a minute clearance to said one substrate; and a liquid crystal filled in the clearance between said one substrate and said other substrate, wherein the wiring lines of at least said signal lines comprises a wiring line of a laminated structure formed on the side of said one substrate, wherein said laminated structure includes a first layer made of a first metal layer and a second layer formed over said first layer and made of a second metal layer having the same principal component as that of said first metal layer, but a different added element and/or a different composition, and wherein said first layer. has a side end face having a right-tapered shape, whereas said second layer has a side end face set at a right angle or is counter-tapered with respect to the substrate face.

(3) A liquid crystal display device according to feature (2), wherein said first layer is made of a pure chromium layer, whereas said second layer is made of an alloy layer containing chromium and molybdenum as its principal components.

(4) A liquid crystal display device is provided with one substrate having a plurality of wiring lines, including a scanning signal line, a video signal line and a pixel electrode, and an active element connected with said scanning signal line and said video signal line for controlling ON/OFF operation of the pixel; the other substrate including at least a color filter and adhered through a minute clearance to said one substrate; and a liquid crystal filled in the clearance between said one substrate and said other substrate, wherein the wiring lines of at least said signal lines comprises a laminated structure formed on the side of said one substrate, wherein said laminated structure includes a first layer containing chromium and tungsten as its principal component and a second layer formed over said first layer and made of chromium and molybdenum as its principal components, and wherein said first layer has a side end face having a right-tapered shape, whereas said second layer has a side end face set at a right angle or is counter-tapered with respect to the substrate face.

(5) A liquid crystal display device is provided with one substrate having a plurality of wiring lines, including a scanning signal line, a video signal line and a pixel electrode, and an active element connected with said scanning signal line and said video signal line for controlling ON/OFF operation of the pixel; the other substrate including at least a color filter and which is adhered through a minute clearance to said one substrate; and a liquid crystal filled in the clearance between said one substrate and said other substrate, wherein the wiring lines of at least said signal lines comprises a three-layered laminated structure formed on the side of said one substrate, wherein either the first layer or the third layer contains two kinds of metals having the same principal component, but a different added element and/or a difference composition, wherein said second layer is made of a metal having a principal component other than those of said first and third layers and which is capable of being selectively etched from said first and third layers, and wherein either of said first layer or said second layer is more etched back than the other.

(6) A liquid crystal display device according to feature (5), wherein said laminated structure has three layers of Cr, an Al alloy and a Cr—Mo alloy.

(7) A liquid crystal display device according to features (1) to (6), wherein the uppermost layer and the underlying layer of said laminated structure have a film thickness ratio of 0.3 or less.

Here, the following features (8) to (13) can be further adopted as a process for making the above-specified wiring structures:

(8) Over the insulating substrate (will be simply called the "substrate") of glass or the like, there is formed a wiring line having a two-layered laminated structure which includes a first layer at the substrate side and made of pure chromium (Cr) and a second layer overlying the first layer and made of a chromium and molybdenum (Cr—Mo) alloy.

(9) Over the substrate or the underlying layer of SiO or the like formed on the surface of the substrate, there is formed through the pure chromium layer a wiring line which is made of the chromium-molybdenum alloy layer.

(10) There are arranged over the substrate a gate wiring line and a drain wiring line, the former of which is made of a laminated structure of the pure Cr layer and the Cr—Mo alloy layer and the latter of which is made of a single-layered structure composed of a laminated wiring line similar to that of the gate wiring line or the Cr—Mo alloy layer.

(11) The gate wiring line is made of a laminated structure composed of a pure Cr layer and a Cr—Mo alloy layer, whereas a pixel electrode is made of an indium/zinc oxide (ITO) so that an added capacity is formed by sandwiching an insulating layer in between.

(12) A wiring line of the aforementioned two-layered laminated structure is formed over the substrate, and its lower layer has a side end face right-tapered, whereas its upper layer has a side end face set at a right angle or is counter-tapered with respect to the substrate face.

(13) A laminated structure film having two kinds of wiring materials of different compositions is dipped in an etching liquid (etchant) so that the wiring line is right-tapered at its side end face by setting the corrosion potential of the second layer (or upper layer) of the laminated structure lower in the liquid than that of the first layer (or lower layer) thereby to set the etching rate of the first and second layer interface different than that of the first layer by the electrochemical reaction.

In the wiring line having the aforementioned two-layered laminated structure, the lower pure Cr layer is featured to have an excellent adhesion to the substrate or the bed layer. On the other hand, the upper layer of the Cr—Mo alloy is enabled to have a lower specific resistance of the materials and a lower contact resistance to the upper layer than those of the pure Cr layer by introducing Mo and Cr having low specific resistance into the alloy.

Another advantage is that the film stress can be drastically lowered, as compared with a pure Cr layer, by making the alloy of Mo and by optimizing the sputtering condition.

By establishing a difference in the corrosion potential between the upper layer and the lower layer, moreover, the interface between the upper layer and the lower layer is etched earlier than the lower layer due to the corrosion potential difference, i.e., by the electrochemical reaction inbetween when the two layers are dipped in the common etchant. The side etching proceeds fastest at the interface between the upper and the lower layer. As a result, the side etching proceeds in the upper layer but proceeds earlier at the upper portion than at the lower portion in the lower layer.

Figure 5:
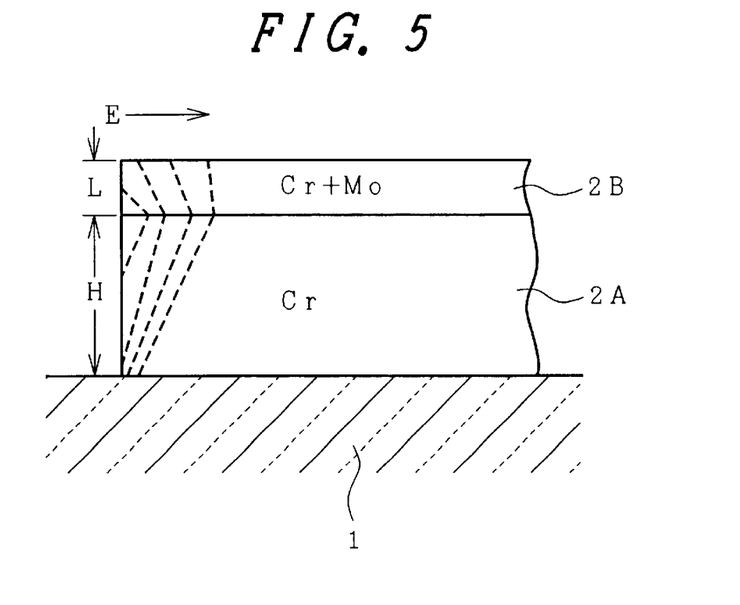
FIG. 5 is a schematic diagram for explaining a state in which etching is performed by a electrochemical reaction with a difference in the corrosion potential between an upper layer and a lower layer.

FIG. 5 is a schematic diagram for explaining a state in which the etching proceeds by electrochemical reaction with a difference in the corrosion potential between the upper layer and the lower layer.

A wiring layer having a two-layered laminated structure is formed over the substrate 1 and is composed of a first layer 2A and a second layer 2B. And, the first layer or the lower layer is made of pure chromium (Cr), whereas the second layer or the upper layer is made of a chromium-molybdenum (Cr—Mo) alloy. Then, by setting the corrosion potential of the first layer 2A in the etchant high (H) and the corrosion potential of the second layer 2B low (L), an electrochemical reaction is caused between these two layers when they are dipped in the etchant. By this electrochemical reaction, the etching proceeds, as indicated by arrow E. Furthermore, by setting the corrosion potential of the first layer low and the corrosion potential of the second layer high, similar etching proceeds.

Under the influence of the electrochemical reaction, the etching rate takes its maximum at the interface between the upper and lower layers so that the lower layer 2A is worked at its whole side end face into a right-tapered shape, i.e., a taper which extends in a direction away from the face of the substrate; whereas the upper layer 2B is worked at its side end face into either a shape normal to the face of the substrate 1 or a slightly counter-tapered shape which is a direction opposite to the taper of the lower layer.

When the etching rate of the upper layer is thus relatively accelerated by the electrochemical reaction between the upper and lower layers of two kinds of different compositions, the side-etching of the upper layer has to proceed even while the lower layer is being etched. This makes it necessary to make the upper and lower layers of either from an identical alloy group or such a material as can be etched with an identical etchant even if made of different metals, so that the etching of the two layers may proceed with the same etchant.

If the corrosion potential difference of the two layers is excessively large, moreover, the upper layer is exclusively etched abruptly, but the etching of the lower layer does not proceed or takes a small taper angle if etched. It has been experimentally found that the desirable corrosion potential difference between the upper and lower layers is set at 3 mV to 300 mV.

The desired taper angle has been achieved within that range, especially from 5 mV to 200 mV.

If this condition is satisfied, a wiring line having the desired taper shape can be formed by making the upper layer and the lower layer into a laminated structure even if the etching rate of the composition of the lower layer is higher than that of the upper layer. The combination of the first and second layers may be other than that of pure Cr and a Cr—Mo alloy. Similar effects can also be obtained from a laminated structure which is made of a Cr—W alloy and pure Cr by adding W in place of Mo. Moreover, the corrosion potential difference of the two layers may be controlled by adding different second elements to the two layers. When the first layer is made of a Cr—W alloy, whereas the second layer is made of the Cr—Mo alloy, for example, a corrosion potential difference can be established between the layers of the laminated structure to give the individual layers functions other than the corrosion potential. In the case of this combination, for example, the film stress can be lowered in the first layer, and the contact resistance to the overlying layer can be reduced in the second layer.

By thus tapering the side end faces of the wiring line to be formed over the substrate, it is possible to improve the step coverage of the insulating film to be formed thereover. It is further possible to solve the problems, such as the deterioration in the insulating breakdown voltage, the cracks which might otherwise be caused in the thin film (or CVD film) such as the CVD insulating film at the portions where the lower layer wiring line is ridden over by another wiring line (or upper wiring line) formed at the upper portion, or the disconnection of the drain wiring line or the source wiring line to be formed thereover.

Here, with an etching treatment which makes use of the aforementioned electrochemical reaction, and with the small thickness of the upper layer, the defects in the step coverage of the film to be formed over the upper layer can be avoided even if the upper layer has a side end face set at a right angle or is counter-tapered with respect to the substrate face.

Figure 6:
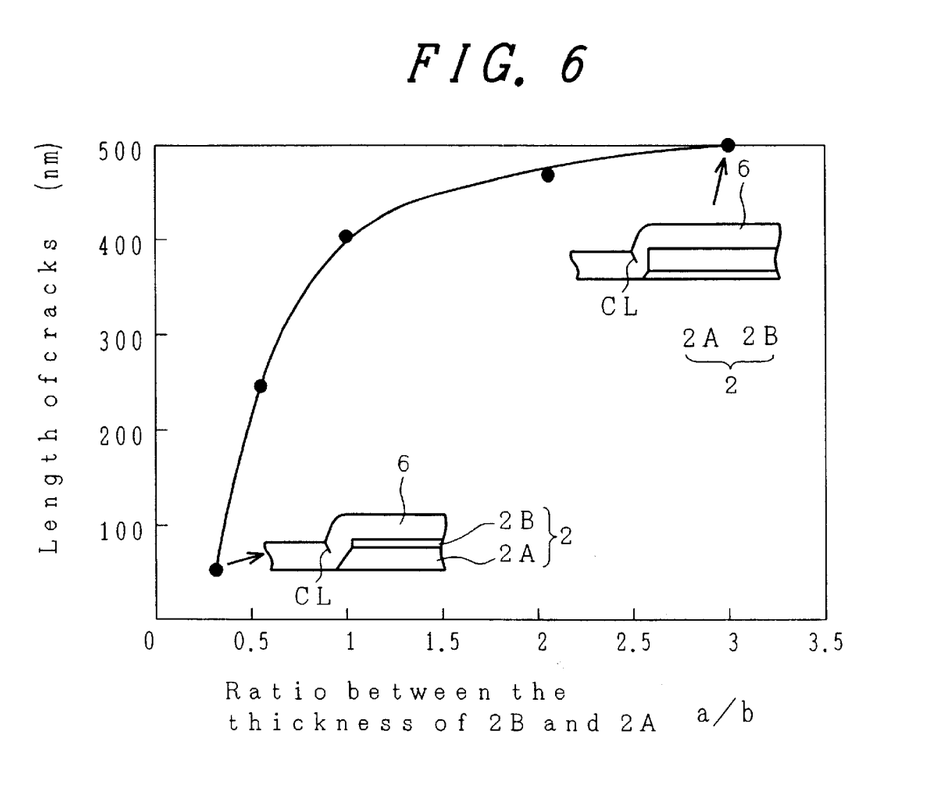
FIG. 6 is a graph of a change in the length of cracks which extend in CVD film formed in a gate wiring portion when the film ratio between an upper layer and a lower layer is changed.

FIG. 6 is an explanatory diagram of a change in the length of cracks to extend in the CVD film formed in the gate wiring portion when the film ratio between the upper layer and the lower layer is changed. The abscissa indicates the ratio a/b between the film thickness a of the lower layer and the film thickness b of the upper layer, and the ordinate indicates the crack length (nm). Here in the section of the film, CL designates cracks.

Here, the thickness of the film to be formed as the insulating film 6 by the CVD method is usually 300 to 400 nm.

When the thickness a of the upper layer is larger the thickness that b of the lower layer, that is, when the ratio a/b is no less than 1, the coverage of the gate electrode 2 with the insulating film 6 is so poor as to cause long racks.

As the ratio a/b decreases, on the contrary, the cracks become harder to cause so that the breakdown voltage between the gate/drain is improved.

It is clear from FIG. 6 that the crack length exceeds 300 nm for an a/b no less than 0.1, but exceeds 400 nm for an a/b no more than 1.0.

By making the film of the upper layer 2B thin to provide an a/b ratio of no more than 0.3, moreover, the cracks can be completely eliminated or reduced to a state of no practical problem. When the film thickness of the lower layer 2A is set to 200 nm, for example, an excellent coverage having no substantial crack can be realized for a film thickness of the upper layer 2B of no more than 60 nm.

For a smaller film thickness of the upper layer 2B, it is possible to further reduce the influence of cracks in the insulating film to be formed over the upper layer 2B. Since the film thickness indispensable for forming the thin film all over the substrate is 10 nm or more, however, it is desired to set the film thickness of the upper layer 2B at a value from 10 nm to 60 nm. When the film thickness of the upper layer must be thickner than 60 nm, the combination of taper-etching, which utilizes electrochemical reaction, and another taper-etching method, which utilizes penetration of etchant at the interface between photo-resist and the upper layer is available.

Figure 7:
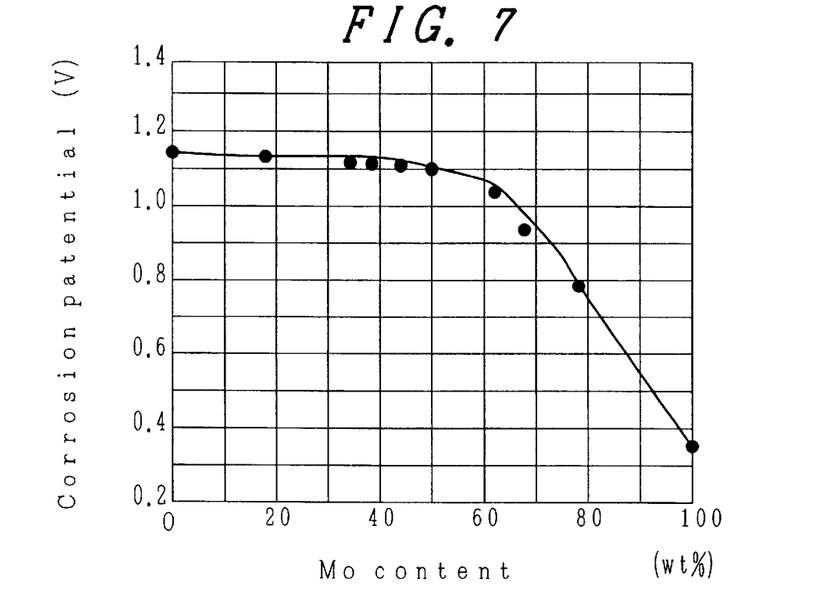
FIG. 7 is a graph of the result of a change, as measured by changing a Mo concentration, in the corrosion potentials of pure Cr and a Cr—Mo alloy in an aqueous solution of ceric nitrate.

FIG. 7 is an explanatory diagram of the result of a change, as measured by changing the Mo concentration, in the corrosion potentials of pure Cr and a Cr—Mo alloy in an aqueous solution of ceric nitrate.

The corrosion potential is at 1,150 mV for pure Cr, that is, when the Mo concentration is 0, and at 1,100 mV for the alloy containing Cr-50 Wt. % of Mo. By making use of the potential difference between the two, it is possible to effect the taperetching shown in FIG. 6. Here, the corrosion potential of the pure Mo is as low as 360 mV so that the corrosion potential of the Cr—Mo alloy becomes lower for a higher Mo concentration.

Figure 8:
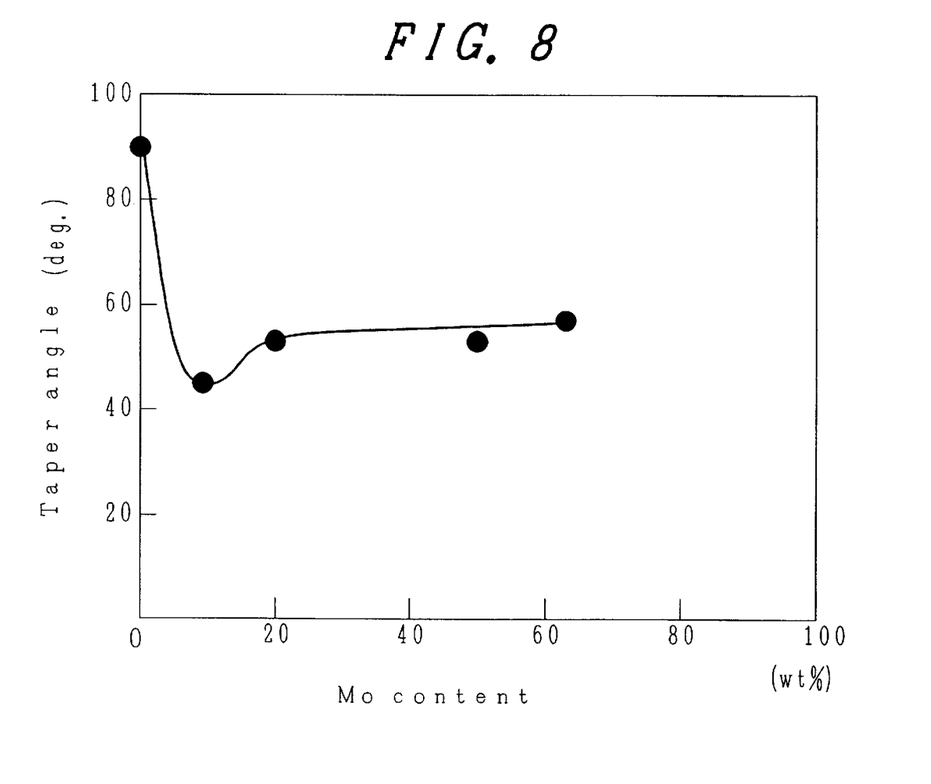
FIG. 8 is a graph of a change in a taper angle when the composition of the Cr—Mo alloy to be combined with the pure Cr is changed.

FIG. 8 is an explanatory diagram of a change in the taper angle when the composition of the Cr—Mo alloy to be combined with the pure Cr is changed.

When the Mo concentration is low, as shown, that is, in the case of the pure Cr, the wiring line is exclusively made of Cr so that the taper angle takes a value of 90 degrees (or normal to the substrate face). When the laminated layer of Cr—Mo is made by adding Mo, the taper angle is lowered so that a taper angle of 40 to 60 degrees is obtained by adding 10 to 65% of Mo. For the composition of Cr-50 Wt. % of Mo, the taper angle is 55 degrees. As the Mo concentration of the upper layer rises to increase the corrosion potential difference between the two layers, the taper angle of the lower layer is hardly changed, but the upper layer tends to be counter-tapered, so that the overall shape is poor. It is therefore recommended that the Mo concentration is selected within a range of 10 Wt. % to 60 Wt. %.

According to the invention based on the technical items thus far described, it is possible to improve the taper angle distribution drastically in the substrate face.

In the tapering case making use of impregnation of the etchant into the clearance between the photoresist and the metallic thin film, on the other hand, the taper angle may be dispersed so largely reflecting the interface dispersion of the adhesion between the photoresist and the metallic thin film as to be doubled between the central portion and the peripheral portion. In the case of the embodiment, on the contrary, the aforementioned corrosion potential difference is determined by the material employed. According to the invention, by making use of the potential difference between the upper layer film and the lower layer film, therefore, the in-face dispersion of the taper angle of the etching treatment can be limited within ±9%.

When the invention is applied to the formation of a gate wiring line in an inverted stagger type TFT, the step coverage of an insulating film (or gate insulating film), an a-Si semiconductor film or a drain wiring line of SiN to be formed over the gate wiring line is improved to raise the breakdown voltage and to reduce the percent of defects, such as the disconnection of the drain wiring line.

Moreover, the upper layer containing the added Mo is hard to remain a fluoride and to oxidize in the oxidizing atmosphere, even dry-etched with a fluorine containing gas, so that its contact with another over electrode can be kept satisfactory.

The two layers for establishing the corrosion potential difference between the laminated films need not directly contact each other at all times, but similar effects can be achieved if the two layers are in contact through a conductive layer. It is therefore possible to make a three-layered structure in which a conductor layer of Al to be selectively etched with Cr is sandwiched between the Cr layer and the Cr—Mo layer. At this time, when the uppermost Cr layer is etched at the time of etching the lowermost Cr layer or Cr—Mo layer, an electrochemical reaction can be effected inbetween to etch one of them backward in a preferential manner. The shape to be obtained becomes different depending upon which of Cr and Cr—Mo is employed as the uppermost layer, as shown in FIGS. 9A to 9C.

Figure 9A:
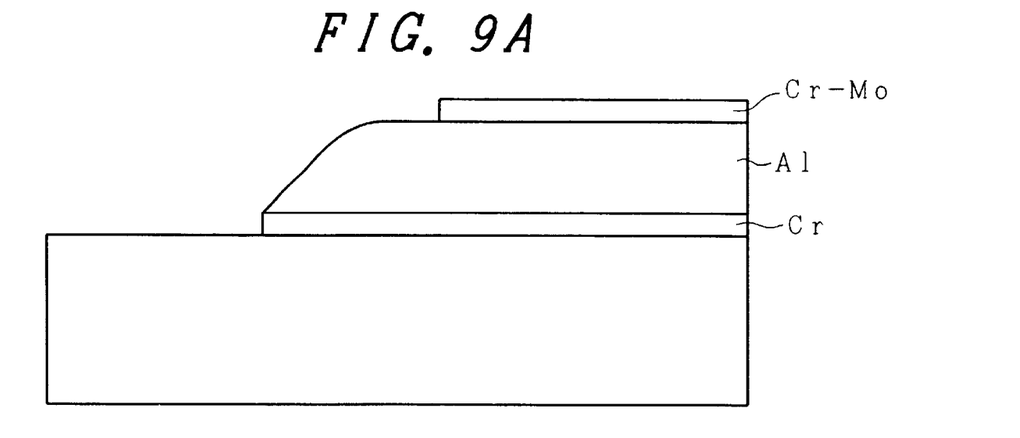
FIGS. 9A to 9C are explanatory diagrams of etched shapes of a two- or three-layered structure.
Figure 9B:
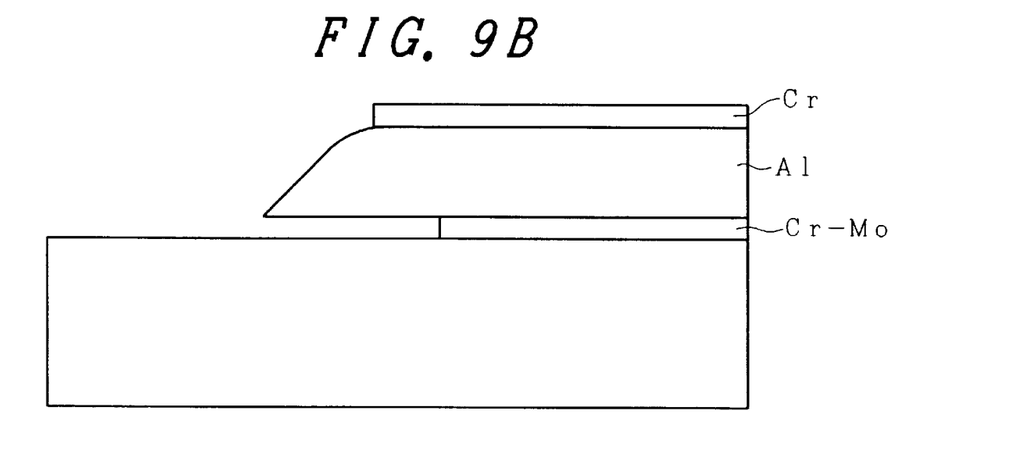
Figure 9C:
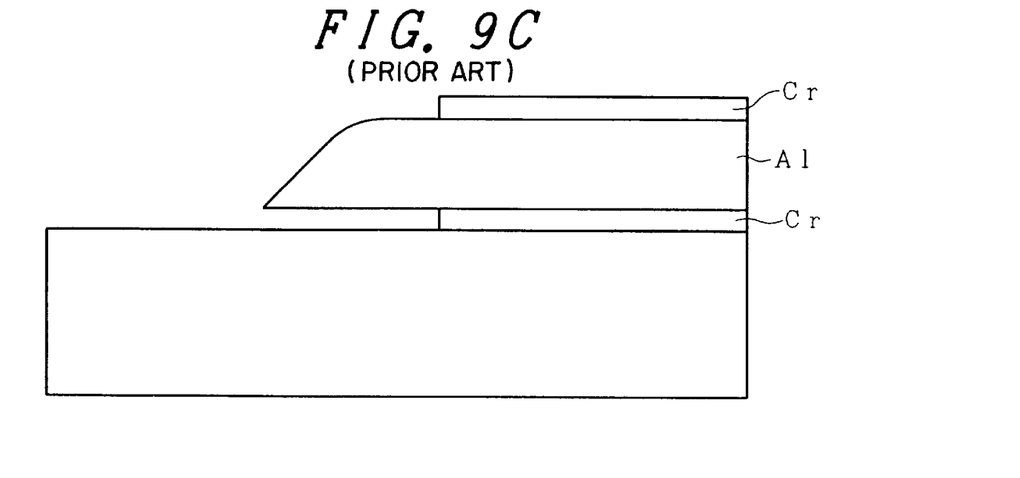

FIGS. 9A to 9C are explanatory diagrams of etched shapes of the two- or three-layered structure. When a film having a low corrosion potential is employed as the uppermost layer, as shown in FIG. 9A, the uppermost layer retracts from the Al, but this retraction can be suppressed. As a result, the overhang of the Al from the lower layer of Cr can be reduced to smooth the entire wiring line as a whole.

When a film having a low corrosion potential is employed as the lowermost layer, on the other hand, the retraction of the lowermost layer is promoted whereas the retraction of the uppermost layer is suppressed, as shown in FIG. 9B. As a result, the Al surface other than the end portion can be covered with the Cr to suppress the growth of a hillock of the Al from the end portion.

When the entire wiring line has a smooth sectional shape, the film construction may be made, as shown in FIG. 9A. When the hillock from the Al film is to be prevented, on the other hand, the film construction may be made as shown in FIG. 9B. Here, FIG. 9C shows an example of the prior art, in which only the Al layer protrudes to raise the problems in the overall shape and the anti-hillock requirement.

DESCRIPTION OF THE PREFERRED EMBODIMENT

The invention now will be described in detail in connection with a representative embodiment.

Figure 1:
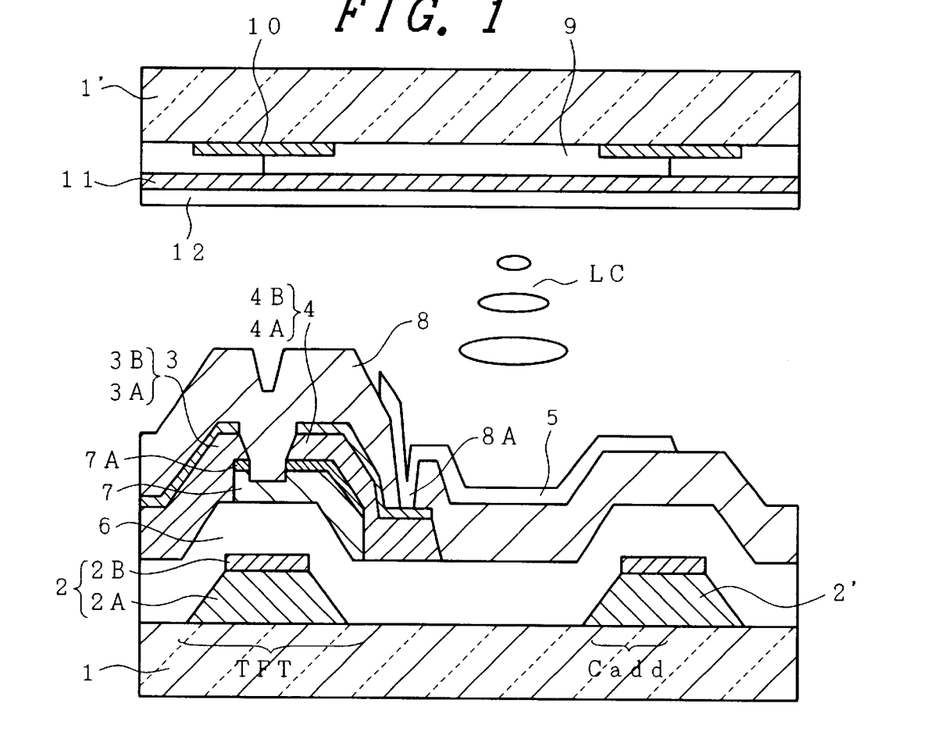
FIG. 1 is a partial section for explaining an essential structure of a liquid crystal display device according to the present invention.
Figure 2:
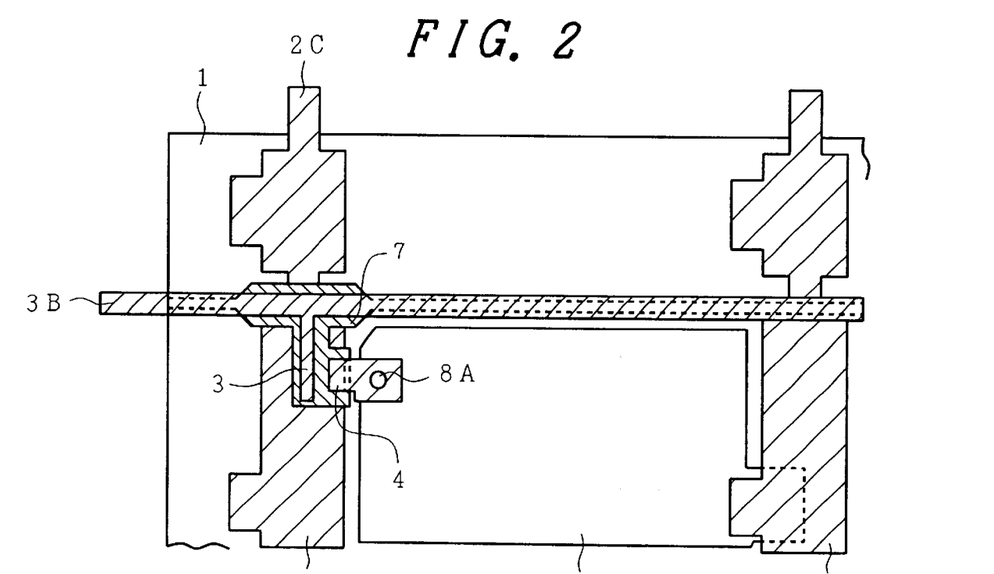
FIG. 2 is a partial top plan view for explaining an essential structure of the liquid crystal display device according to the invention.

FIG. 1 is a partial section for explaining an essential structure of a liquid crystal display device according to the invention, and FIG. 2 is a partial top plan view for explaining an essential structure of the same. As in FIG. 11, reference numeral 1 designates a TFT substrate; numeral 1' designates a filter substrate; numeral 2 designates a gate electrode; numeral 3 designates a drain electrode; numeral 4 designates a source electrode; numeral 5 designates a pixel electrode; numeral 6 designates an insulating film; numeral 7 designates a semiconductor layer; numeral 7A designates a contact layer; numeral 8 designates a passivation film; numeral 8A designates a contact hole; numeral 9 designates a color filter; numeral 10 designates a black matrix; numeral 11 designates a smoothing layer; letters TFT designate a thin film transistor; letters Cadd designate a capacity added element; and letters LC designate a liquid crystal. Moreover, numerals 3A and 3B, and 4A and 4B designate the laminated portions of a Cr—Mo alloy layer and pure Cr constructing the drain electrode 3 and the source electrode 4, respectively. Numerals 2A and 2B designate a first layer (or lower layer) and a second layer (or upper layer) constructing the gate electrode 2.

Of the gate electrode 2, the lower layer 2A is a pure Cr layer, whereas the upper layer 2B is a Cr—Mo alloy layer. Moreover, the lower layer 2A is given a thickness of 150 nm, whereas the upper layer 2B is given a thickness of 50 nm, and the side end face of the wiring line is mostly right-tapered in a satisfactory manner i.e., tapered in a direction away from the wiring line is provided. Here, the side end face of the upper layer 2B is shaped vertically relative to the substrate face, as shown in FIG. 1, but has a small thickness so that the entire wiring line exerts no substantial influence on the right-tapered shape.

Since the gate electrode 2 is thus given a laminated structure having the first layer of pure Cr satisfactorily right-tapered, it is possible to prevent the drain electrode 3 and the source electrode 4 to be formed thereover from being broken and to avoid a disadvantage that either cracks or pin holes are formed in the insulating film 6. Since the lower layer contacting the substrate is made of a pure Cr layer, moreover, the adhesion between the gate electrode 2 and the substrate can be enhanced to prevent the separation of the wiring line, as might otherwise be caused by thermal stress or the like.

All over the surface of the substrate 1, having the gate electrode 2 thereon, there is formed a silicon nitride (SIN) film serving as an insulating film 6 for providing a layer of insulation between the gate electrode 2 and the drain electrode 3, as well as the source electrode 4, as will be described hereinafter.

Over the insulating film 6, at one corner of the pixel region which is defined by the gate electrode 2, the drain electrode 3 and the source electrode 4, moreover, there is formed a thin film transistor TFT. In the region forming this thin film transistor TFT, there is formed as the upper layer of the insulating film 6 and on the surface of the insulating film 6, located over the gate electrode 2, a semiconductor layer 7 which is made of amorphous silicon (a-Si) crossing the gate electrode 2.

Moreover, this semiconductor layer 7 is formed to act as the lower layer of the region forming the source electrode 4. The laminated structure of the source electrode 4 over the semiconductor layer 7 is provided for preventing benching and for reducing the capacity between itself and the intersecting gate electrode 2.

On the surface of the semiconductor layer 7 in the region forming the thin film transistor TFT, there are formed the drain electrode 3 and the source electrode 4, which are arranged to confront each other over the gate electrode 2, as viewed in a top plan view.

Here, in the interface of the surface of the semiconductor layer 7 with the drain electrode 3 and the source electrode 4, there is formed the contact layer 7A which is made by doping the semiconductor layer 7 with an impurity of high concentration. This highly doped impurity layer is formed all over the semiconductor layer 7, when this layer 7 is formed, by etching the impurity layer, as exposed from the electrodes 3 and 4 to be formed later, by using the electrodes 3 and 4 as masks.

Moreover, the drain electrode 3 and the source electrode 4 are formed at the same step and of the same material. This material is exemplified by a laminated wiring line shared with the gate electrode 2. Another example may be a single alloy layer of Cr and Mo.

As shown in FIG. 2, on the other hand, the source electrode 4 extends as far as the region which forms the pixel electrode 5 and makes a contact with pixel electrode 5 at this extension.

Here, the source electrode 4 is made of material shared with the drain electrode 3 and is formed of a laminated structure of the layers 3B and 4B of Cr—Mo alloy and the layers 3A and 4B of Cr.

All over the surface of the substrate 1 thus worked, there is formed the passivation film 8 which is made of a silicon nitride (SIN) film, for example, so as to avoid direct contact with the liquid crystal by the thin film transistor TFT. In this passivation film 8, there is formed a contact hole 8A for exposing a portion of the extension of the source electrode 4.

In the pixel region in the upper face of the passivation film 8, moreover, there is formed the pixel electrode 5 which is made of an ITO film, for example. This pixel electrode 5 can be electrically connected with the source electrode 4 through the contact hole 8A.

In this case, the pixel electrode 5 is partially extended over another adjoining gate electrode 2' which is different from the gate electrode 2 for driving the thin film transistor TFT. As a result, the capacity added layer Cadd is constructed of a dielectric film of a laminated structure which is composed of the insulating film 6, sandwiched between the pixel electrode 5 and the adjoining gate electrode 2', and the passivation film 8.

Here, the substrate 1 having the various films is adhered through the liquid crystal LC to the other substrate (or transparent substrate) 1', as shown in FIG. 1. On the other side of the substrate 1' on the liquid crystal LC, there are formed by the ITO method plural color filters 9, which are defined by a black matrix 10, and the common electrode 12 which is shared among the individual pixel regions through the smoothing layer 11 covering the color filters 9.

With the construction thus far described, the disconnection and short-circuiting of the drain electrode and the source electrode can be reduced to provide a highly reliable liquid crystal display device.

One example of the process for manufacturing the liquid crystal display device according to the invention will be described with reference to FIGS. 1 to 4F.

FIGS. 3A to 3C and FIGS. 4D to 4F are schematic diagrams for explaining an example of the steps of the process for manufacturing the liquid crystal display device according to the invention, and the same reference numerals as those of FIGS. 1 and 2 correspond to common portions.

Figure 3A:
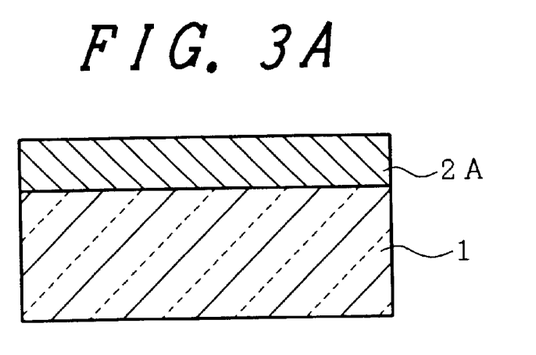
FIGS. 3A to 3C are schematic diagrams for explaining one example of the steps of a process for manufacturing the liquid crystal display device according to the invention.

First of all, the first layer (or lower layer) 2A of pure Cr is filmed (as shown in FIG. 3A) to have a thickness of 150 nm all over the principal surface of the glass substrate 1 by using the sputtering method or the like.

Figure 3B:
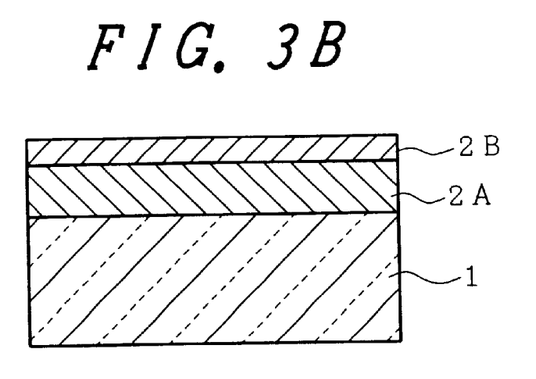

Next, the alloy layer containing 50 Wt. % of Cr and Mo is filmed (as shown in FIG. 3B) to form the second layer (or upper layer) 2B having a thickness of 50 nm over the first upper layer by the sputtering method or the like, thereby to form a laminated structure mainly for the Cr wiring line. This laminated structure provides the gate electrode 2.

Figure 3C:
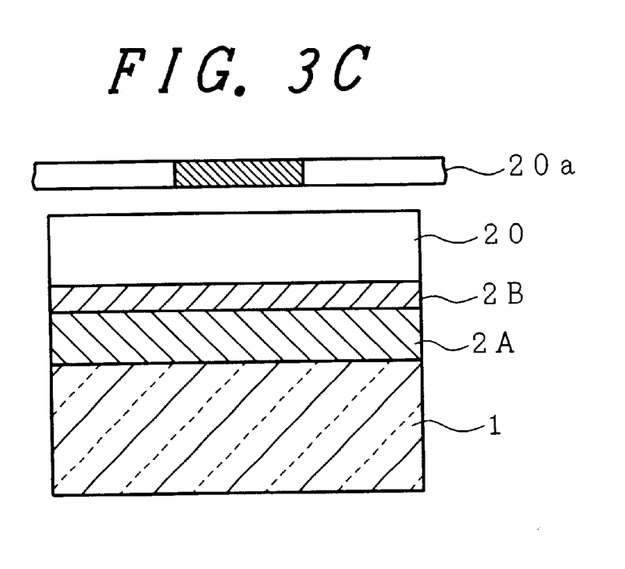

A photoresist 20 is applied (as shown in FIG. 3C) all over the upper face of the laminated structure and is selectively exposed through a photo mask 20a having a pattern of a gate electrode terminal 2C or the like of the thin ftlm transistor TFT to be formed integrally with the gate electrode 2.

Figure 4D:
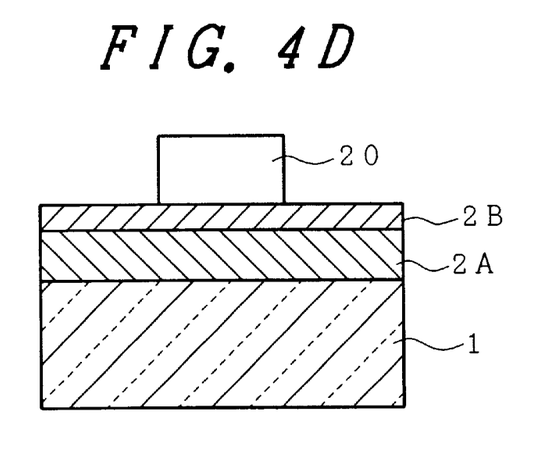
FIGS. 4D to 4F are schematic diagrams of the steps subsequent to those of FIGS. 3A to 3C of the process for manufacturing the liquid crystal display device according to the invention.

After this, the photoresist 20 is developed (as shown in FIG. 4D) to remove the portion corresponding to a region, other than what is required to form the gate electrode 2, the gate electrode terminal 2C and so on, thereby to expose the laminated structure of the removed portion.

Figure 4E:
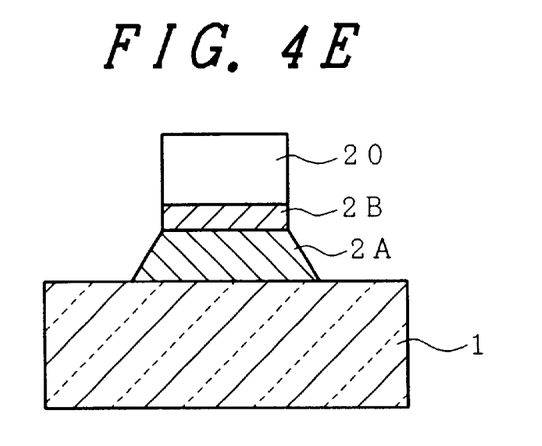

By using the residual photoresist 20 as a mask, the exposed laminated structure is dipped in an etchant for etching treatment. This etchant is exemplified by an aqueous solution of ceric nitrate and ammonia. At this etching treatment, the upper and lower layers which make up the laminated structure have corrosion potentials of 1,100 mV and 1,150 mV, respectively, for the upper alloy layer of 50 Wt. % of Cr and Mo and the lower layer of pure Cr, so that a potential difference of 50 mV is established inbetween. By making the corrosion potential of the upper layer lower than that of the lower layer, the interfacial layer having the lower corrosion potential can be etched (as shown in FIG. 4E) at a higher rate than the lower layer by electrochemical reaction so as to right-taper the two side end faces of the gate electrode 2 satisfactorily, ie., in a direction away from the substrate surface. Since the side end faces of the upper layer are then set at a right angle or counter-tapered with respect to the substrate surface, or counter-tapered with respect to the substrate surface, i.e., in a direction opposite to the right-taper of the lower layer. it is desirable to make the upper layer thinner than the lower layer. For example, the upper layer is given a thickness of 50 nm whereas the lower layer is given a thickness of 150 nm.

Figure 4F:
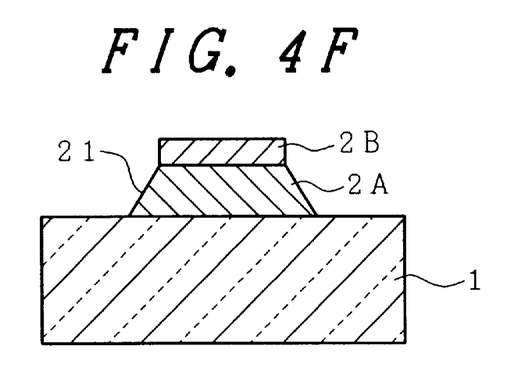

After the completion of the etching treatment, the photoresist 20 is removed (as shown in FIG. 4F) to form the gate electrode 2, the gate electrode terminal 2C and so on with the laminated film which is left after the etching treatment.

The substrate 1, thus having the gate electrode 2 and the gate electrode terminal 2C formed by the aforementioned steps, is processed to form the thin film transistor TFT by the following steps.

First of all, the substrate 1 having the gate electrode 2 and gate electrode terminal 2C formed by the aforementioned individual steps is formed all over its principal face sequentially with the insulating layer 6 made of a silicon nitride, the semiconductor layer 7 of i-type amorphous Si and an amorphous Si semiconductor contact layer 7A doped with an n-type impurity, for example, by using the CVD method.

In this case, the manufacture process can be simplified by sequentially forming the insulating layer 6, the semiconductor layer 7 and the semiconductor contact layer 7A doped with the n-type impurity, in a continuous manner. Since the gate electrode 1C shown in FIG. 1 is laminated in its entirety at this time, the coverage of the gate insulating film to be formed by the CVD method over the gate electrode 1c is improved so as to avoid the defect of the gate insulating film and the short-circuiting and disconnection between the drain line or the source electrode to be formed over the gate insulating film and the gate electrode.

Then, the photoresist film is applied to the whole area of the upper face of the semiconductor contact layer 7A doped with the n-type impurity and is selectively exposed through the photo mask having the pattern of the thin film transistor TFT.

After this, the photoresist film is developed to remove the portion other than the region for forming the thin film transistor TFT, thereby to expose the upper face of the semiconductor contact layer 7A, as doped with the n-type impurity, from that removed portion.

The residual photoresist film is used as the mask to selectively etch the semiconductor contact layer 7A, as exposed from that mask, and the underlying semiconductor layer 7.

In this case, the insulating layer 6, located below the semiconductor layer 7, is not etched but is left as it is.

As a result, in the region for forming the thin film transistor TFT, there are sequentially formed the silicon nitride film for the gate insulating layer, the i-type amorphous Si semiconductor layer, and the amorphous Si semiconductor layer doped with the n-type impurity for the contact layer.

Below the source electrode 4 subsequently formed, there is formed the laminated structure of the semiconductor contact layer 7A, doped with the n-type impurity, and the semiconductor layer 7.

All over the principal surface of the substrate 1 thus processed, moreover, there is formed a laminated structure of a Cr—Mo alloy layer and a pure Cr layer by the sputtering method, for example. This laminated structure exposes the photoresist selectively through the photo mask which has the pattern including the source electrode 4, the drain electrode 3 and the drain electrode terminal 3b.

After this, the photoresist film is developed to remove the photoresist film corresponding to the region other than those for forming the source electrode 4, the drain electrode 3 and the drain electrode terminal 3B, thereby to expose the aforementioned alloy film from the removed portions.

By using the residual photoresist film as a mask, moreover, the alloy layer, as exposed from this mask, is selectively etched.

As a result, the source electrode 4, the drain electrode 3 and the drain electrode terminal 3B are formed from the remaining alloy layer.

Moreover, the semiconductor contact layer 7A, overlying the semiconductor layer 7 formed in the region to form the thin film transistor TFT and which is doped with the n-type impurity, is selectively etched by using the source electrode 4 and the drain electrode 3 as a mask. As a result, the semiconductor contact layer 7A, as left and doped with the n-type impurity, is formed only in the interface for the semiconductor layer 7 between the source electrode 4 and the drain electrode 3 so that it functions as the contact layer 7A.

Next, a passivation film 8 of silicon nitride is formed by the plasma CVD method, for example, all over the principal surface of the substrate 1 processed by the aforementioned individual steps. At this time, the side end edges of the source electrode 4 and the drain electrode 3 are wholly right-tapered profiling the shape of the underlying gate electrode 2. As a result, the step coverage by the passivation film 8 can be improved to reduce film defects, such as the pin holes at the riding portions of the gate electrode and the drain wiring line at the passivation film 8. Since the gate electrode and the drain electrode are processed to have a right taper, moreover, the step on the surface at the portion to form the thin film transistor TFT is made gentle.

Moreover, the contact hole 8A is formed in the passivation film 8. Simultaneously with this, openings are formed in both the passivation film 8 formed over the drain electrode terminal 3B and the passivation film 8 formed over the gate electrode terminal 2C.

The mask, used for forming the passivation film 8, is employed as it is to perform the dry etching. As a result, a through hole is formed in the insulating layer 6 to expose the surface of the substrate 1 at the gate electrode terminal 2C, the drain electrode terminal 3B and the desired region. When the through hole is formed with a dry etching gas, the electrode surface is exposed to that gas during the over-etching time. Since this source electrode surface is made of a Cr—Mo alloy layer, less fluoride or chloride is formed than in the case of a pure Cr layer so that the contact characteristics with the overlying ITO film can be drastically improved.

All over the region of the surface of the substrate 1 thus processed, there is formed an ITO film. This ITO film is given a suitable thickness of 70 to 300 nm, as exemplified here by 40 nm.

The photoresist film is formed all over the surface of the ITO film and is selectively exposed through a photo mask having a pattern including the pixel electrode 5, the gate electrode and the drain electrode terminal.

Then, the photoresist film is developed to remove the portion other than the region for forming the pixel electrode 5, the individual gate electrodes and the drain electrode terminal.

The residual photoresist mask is used as the mask to selectively etch the ITO film exposed from the mask. As a result, the pixel electrode 5 and so on are formed from the residual ITO film.

The filter substrate 1', as shown in FIG. 1, is adhered to the TFT substrate having the desired wiring lines and electrodes formed by the aforementioned individual steps, and the clearance inbetween is filled with liquid crystal LC to form the liquid crystal panel. On the face of the active filter substrate which is to contact the liquid crystal LC, although not shown, there is formed an orientation film for orienting the molecules of the liquid crystal LC initially.

The liquid crystal panel thus prepared is assembled with the various components, as described with reference to FIG. 10, to provide a liquid crystal display device.

Any combination other than that of pure Cr and a Cr—Mo alloy can be adopted if it gives a difference in corrosion potential between the lower layer portion and the upper layer portion. This condition can be satisfied to effect the taperetching even if the upper layer is made of a Cr—W alloy whereas the lower layer is made of the pure Cr, for example. The same condition can also be satisfied to effect the taper-etching even if the upper layer is made of a Cr—Mo alloy, whereas the lower layer is made of a Cr—W alloy. The satisfactory taper-etching can be effected, when the upper layer portion is made of an alloy containing 50 Wt. % of Cr and Mo, whereas the lower layer portion is made of a Cr—W alloy containing 40 Wt. % or more of W.

It is needless to say that the above-specified Cr can be replaced in a single or alloy state by a metallic material for an electrode material having satisfactory working characteristics, as noted by the invention, such as aluminum (Al), titanium (Ti), tungsten (W) or molybdenum (Mo). In short, the taper-etching treatment using a similar mechanism can be performed for the individual materials by adding a second element to each of the metals and by laminating it and the composition which is controlled in the corrosion potential in each etchant.

As has been described hereinbefore, according to the invention, a satisfactory tapered shape can be given especially to the side end face of the scanning signal line to be formed at the thin film transistor TFT thereby to prevent film defects, such as cracks, pin holes or disconnections of the various thin films overlying the scanning signal line, and short-circuiting between the upper and lower layers.

By adopting such a laminated structure for the material of the scanning signal line, which has a lower layer of chromium and an upper layer of a chromium-molybdenum alloy, on the other hand, the contact of the other scanning signal lines and the electrodes to be formed thereover and the metallic thin film is improved. By using pure chromium as the layer on the substrate side, the adhesion with the substrate is enhanced to prevent film separation which might otherwise be caused thermal hysteresis or stress at the subsequent process step.

By giving the right-tapered shape to the other end face of the lower wiring line, moreover, the surface of the thin film transistor substrate can be smoothed to reduce the orientation defects or the like of the liquid crystal thereby to provide a liquid crystal display layer having an excellent contrast.

Here, the invention should not be limited to the so-called "longitudinal field type liquid crystal display device", as has been described in connection with the embodiment, but can likewise be applied to the so-called "transverse field type liquid crystal display device", in which the common electrode is also formed on the side of the active matrix substrate, or another type liquid crystal display device having a crossing portion, in which electrode wiring lines or the like cross each other, or a variety of similar semiconductor devices.

What is claimed is:

1. A display device including:
   a first substrate;
   a wiring line including a first layer and a second layer formed on the substrate;
   said first layer being formed on the substrate and said second layer being formed on said first layer;
   wherein a side end face of said first layer is a tapered structure and an angle formed between a side end face of said first layer and an adjacent side end face of said second layer is smaller than an assumed angle formed between the side end face of said first layer and the adjacent side end face of said second layer when the adjacent side end face of said second layer is assumed to be at a right angle to the substrate.

2. A display device according to claim 1, wherein said first layer includes chromium, and said second layer includes at least one of chromium, tungsten, molybdenum, aluminum, titanium and a mixture thereof.

3. A display device according to claim 1, wherein said first layer contains at least one of tungsten, molybdenum, aluminum, titanium and a mixture thereof.

4. A display device according to claim 1, wherein said first layer includes chromium as a principal component and said second layer contains at least one of tungsten, molybdenum, aluminum, titanium and a mixture thereof.

5. A display device according to claim 1, wherein said second layer includes a material which is a principal component of said first layer.

6. A display device according to claim 5, wherein said first layer includes chromium as the principal component and said second layer contains at least one of chromium-molybdenum and chromium-tungsten.

7. A display device according to claim 6, wherein said second layer contains chromium-molybdenum with a content of molybdenum being from 10% to 65%.

8. A display device according to claim 5, wherein said first layer includes chromium as the principal component and said second layer contains chromium-molybdenum with a content of molybdenum being from 10% to 65%.

9. A display device according to claim 5, wherein said first layer includes chromium as the principal component and said second layer contains chromium-tungsten with a content of tungsten being over 40%.

10. A display device according to any one of claims 1 to 9, wherein said display device includes a liquid crystal layer between the first substrate and another substrate.

11. A display device according to claims 1–9, wherein a thickness A of said second layer and a thickness B of said first layer satisfies a relation that $A/B \leq 0.3$.

12. A display device according to claims 1–9, wherein a thickness of said second layer is from 10 nm to 60 nm.

13. A display device according to claims 1–9, wherein a thickness A of said second layer and a thickness B of said first layer satisfy a relation that $A/B \leq 0.3$, and the thickness of said second layer is from 10 nm to 60 nm.

14. A display device according to claim 1, wherein the side end face of said first layer is tapered so as to extend in a first direction and the adjacent end face of said second layer is a tapered structure having a taper extending in a direction transversely to the extension direction of the taper of the side end face of said first layer so as to form an angle therewith of less than 180°, the adjacent side end face of said second layer extending at an angle other than a right angle to the substrate.

15. A method for manufacturing a display device comprising a step of forming a laminated structure film of wiring lines having two kinds of wiring materials of different compositions on a substrate including:
    dipping the wiring materials in an etching liquid so that
    (1) a lower layer of the wiring lines of the laminated structure is tapered at a side end face; and
    (2) an angle formed between the side end face of said lower layer and an adjacent side end face of an upper layer is smaller than an assumed angle formed between the side end face of said lower layer and the adjacent side end face of said upper layer when the adjacent side end face of said upper layer is assumed to be at a right angle to the substrate; and
    setting the corrosion potential of said upper layer of the laminated structure to be lower in the etching liquid than the corrosion potential of said lower layer of the laminated structure.

16. A method for manufacturing a display device according to claim 15, wherein said lower layer contains chromium as a principal component and said upper layer includes at least one of chromium, tungsten, molybdenum, aluminum, titanium and a mixture thereof.

17. A method for manufacturing a display device according to claim 15, wherein said lower layer contains at least one of tungsten, molybdenum, aluminum, titanium and a mixture thereof.

18. A method for manufacturing a display device according to claim 15, wherein said lower layer contains chromium as a principal component and said upper layer includes tungsten, molybdenum, aluminum, titanium and a mixture thereof.

19. A method for manufacturing a display device according to claim 15, wherein said upper layer contains a material which is a principal component of said lower layer.

20. A method for manufacturing a display device according to claim 18, wherein said lower layer contains chromium as the principal component, and said upper layer contains chromium-molybdenum or chromium-tungsten.

21. A method for manufacturing a display device according to claim 20, wherein said upper layer contains chromium-molybdenum with a molybdenum content being from 10% to 65%.

22. A method for manufacturing a display device according to claim 20, wherein said lower layer includes chromium as the principal component, and said upper layer contains chromium-molybdenum with a molybdenum content being 10% to 65%.

23. A method for manufacturing a display device according to claim 20, wherein said lower layer includes chromium as the principal component, and said upper layer contains chromium-tungsten with a tungsten content being over 40%.

24. A method for manufacturing display device according to any one of claims 15 to 23, wherein a difference of the corrosion potentials between said upper layer and said lower layer is between 3 mV to 300 mV.

25. A method for manufacturing display device according to any one of claims 15 to 23, wherein a difference of the corrosion potentials between said upper layer and said lower layer is between 5 mV to 200 mV.

26. A method for manufacturing a display device according to claims 15 and 16–23, wherein a thickness A of said upper layer and a thickness B of said lower layer satisfy a relation that $A/B \leq 0.3$.

27. A method for manufacturing a display device according to claims 15 and 16–23, wherein a thickness of said upper layer is from 10 nm to 60 nm.

28. A method for manufacturing a display device according to claims 15 and 16–23, wherein a thickness A of said upper layer and a thickness B of said lower layer satisfy a relation that $A/B \leq 0.3$, and the thickness of said upper layer is from 10 nm to 60 nm.

29. A method for manufacturing a display device according to claim 15, wherein the side end face of said first layer is tapered so as to extend in a first direction and the adjacent end face of said second layer is a tapered structure having a taper extending in a direction transversely to the extension direction of the taper of the side end face of said first layer so as to form an angle therewith of less than 180°, the adjacent side end face of said second layer extending at an angle other than a right angle to the substrate.

* * * * *